(12) United States Patent
Girondi

(10) Patent No.: US 7,476,310 B2
(45) Date of Patent: Jan. 13, 2009

(54) FUEL FILTER FOR DIESEL ENGINES WITH HIGH PRESSURE DIRECT INJECTION OF COMMON RAIL TYPE AND THE LIKE

(75) Inventor: Giorgio Girondi, Mantova (IT)

(73) Assignee: UFI Filters S.p.A., Porto Mantovano (Mantova) (IT)

( * ) Notice: Subject to any disclaimer, the term of this patent is extended or adjusted under 35 U.S.C. 154(b) by 611 days.

(21) Appl. No.: 10/531,273

(22) PCT Filed: Oct. 24, 2003

(86) PCT No.: PCT/EP03/12059

§ 371 (c)(1),
(2), (4) Date: Apr. 13, 2005

(87) PCT Pub. No.: WO2004/051070

PCT Pub. Date: Jun. 17, 2004

(65) Prior Publication Data

US 2006/0163146 A1 Jul. 27, 2006

(30) Foreign Application Priority Data

Dec. 3, 2002 (IT) .......................... RE2002A0094

(51) Int. Cl.
*B01D 17/12* (2006.01)
(52) U.S. Cl. .............................. 210/86; 73/292; 73/306; 73/308; 210/103; 210/114; 210/121; 210/149; 210/303; 340/618; 374/142

(58) Field of Classification Search ................... 210/86, 210/103, 104, 114, 115, 121, 149, 184, 299, 210/303–306; 73/290–292, 295, 305, 306, 73/308; 340/603, 612, 618; 337/398; 374/45, 374/141, 142
See application file for complete search history.

(56) References Cited

U.S. PATENT DOCUMENTS

| | | | |
|---|---|---|---|
| 4,321,136 A | 3/1982 | Matsui | |
| 4,502,955 A * | 3/1985 | Schaupp | 210/149 |
| 4,580,542 A | 4/1986 | Kawabata | |
| 4,680,110 A | 7/1987 | Davis | |
| 5,201,223 A * | 4/1993 | McQueen | 73/295 |
| 5,394,134 A * | 2/1995 | Kurz | 337/398 |
| 6,208,254 B1 * | 3/2001 | McQueen et al. | 340/603 |
| 6,471,853 B1 * | 10/2002 | Moscaritolo | 210/85 |

* cited by examiner

*Primary Examiner*—Joseph W Drodge
(74) *Attorney, Agent, or Firm*—Browdy and Neimark, P.L.L.C.

(57) ABSTRACT

Fuel filter for diesel engines with high pressure direct injection of common rail type and the like, comprising an outer casing provided with a fuel inlet conduit (3) and an outlet conduit (4), and containing in its interior a filter means(5), a temperature sensor(15) being positioned in proximity to the bottom of said casing to measure the temperature of the fuel present in the casing.

6 Claims, 3 Drawing Sheets

FUEL FILTER FOR DIESEL ENGINES WITH HIGH PRESSURE DIRECT INJECTION OF COMMON RAIL TYPE AND THE LIKE

This invention relates to a filter for vehicle fuel, in particular for diesel engines of common rail or high pressure direct injection type, and the like. In these types of engine the fuel feed rate to the engine feed pump is much greater than that required by the engine for its operation, as the fuel is used not only as engine feed fluid but also as the lubrication fluid and cooling fluid for the feed pump. That fuel not fed to the cylinders increases in temperature as it removes heat from the pump and is then returned to the vehicle fuel tank.

It has been found that because of the high temperature at which the feed pump operates, after a certain time of engine operation the fuel contained in the vehicle tank or in the engine feed circuit attains a high temperature, of the order of 100° C. and beyond.

A requirement has therefore arisen to control the fuel temperature as too high a fuel temperature could damage components of the engine feed circuit. Moreover in these types of engine the fuel temperature has become an essential parameter in regulating the fuel feed rate to the engine. Measuring the fuel temperature has hence become necessary for correct engine operation. The value of the measured temperature is fed to the electronic control unit which controls fuel feed to the pump and hence to the cylinders.

The known art has solved this need to control the fuel temperature by temperature measurement devices positioned either inside the fuel tank or along the conduits through which the fuel is fed to the engine.

In both cases the devices used require suitable fixing flanges and electric cables for connecting the device to the vehicle electronic control unit. Moreover it is often difficult to install said temperature measurement devices as that engine region in which the conduits are present is crowded with numerous components.

The object of the present invention is to overcome the drawbacks of the known art within the context of a simple and rational solution of low cost. The invention attains said object by virtue of the characteristics defined in the claims.

Specifically, the invention provides a temperature measurement device which is associated with the lower part of the fuel filter installed on the vehicle.

According to a preferred embodiment of the invention, said temperature measurement device is associated with the means for sensing the presence of water accumulated in the bottom of the fuel filter. In this respect it is known that the water present in the fuel tends to create oxidation damage to the metal parts with which it comes into contact, hence the latest generation of filters, in particular for diesel engine fuel, separate not only the impurities but also the water present in the fuel. As water has a specific gravity greater than the fuel, it collects on the bottom of a collection chamber positioned in the lower part of the filter. This water must be bled off on reaching a maximum level, to avoid it interfering with correct filter operation, or it may be returned to the fuel flow leaving the filter.

The water is bled off by suitable means which are activated when a suitable sensor senses that the water in said collection chamber has reached its maximum level.

Said means for sensing the water level comprise a float positioned within the collection chamber and having a specific gravity between the specific gravity of water and the specific gravity of the fuel. The float is mounted on a guide stem, in the interior of which a magnetic field sensor is positioned connected electrically to an electronic card by two conductors. According to the invention, said stem also internally houses the temperature sensor which measures the fuel temperature. Specifically, said temperature sensor is housed in proximity to the free end of the stem, which projects into the water collection chamber. To facilitate heat conduction the sensor is embedded in a conductive resin which is poured into the stem.

The invention is described in detail hereinafter with the aid of the accompanying figures, which illustrate a non-exclusive embodiment thereof by way of example.

Figure 1:
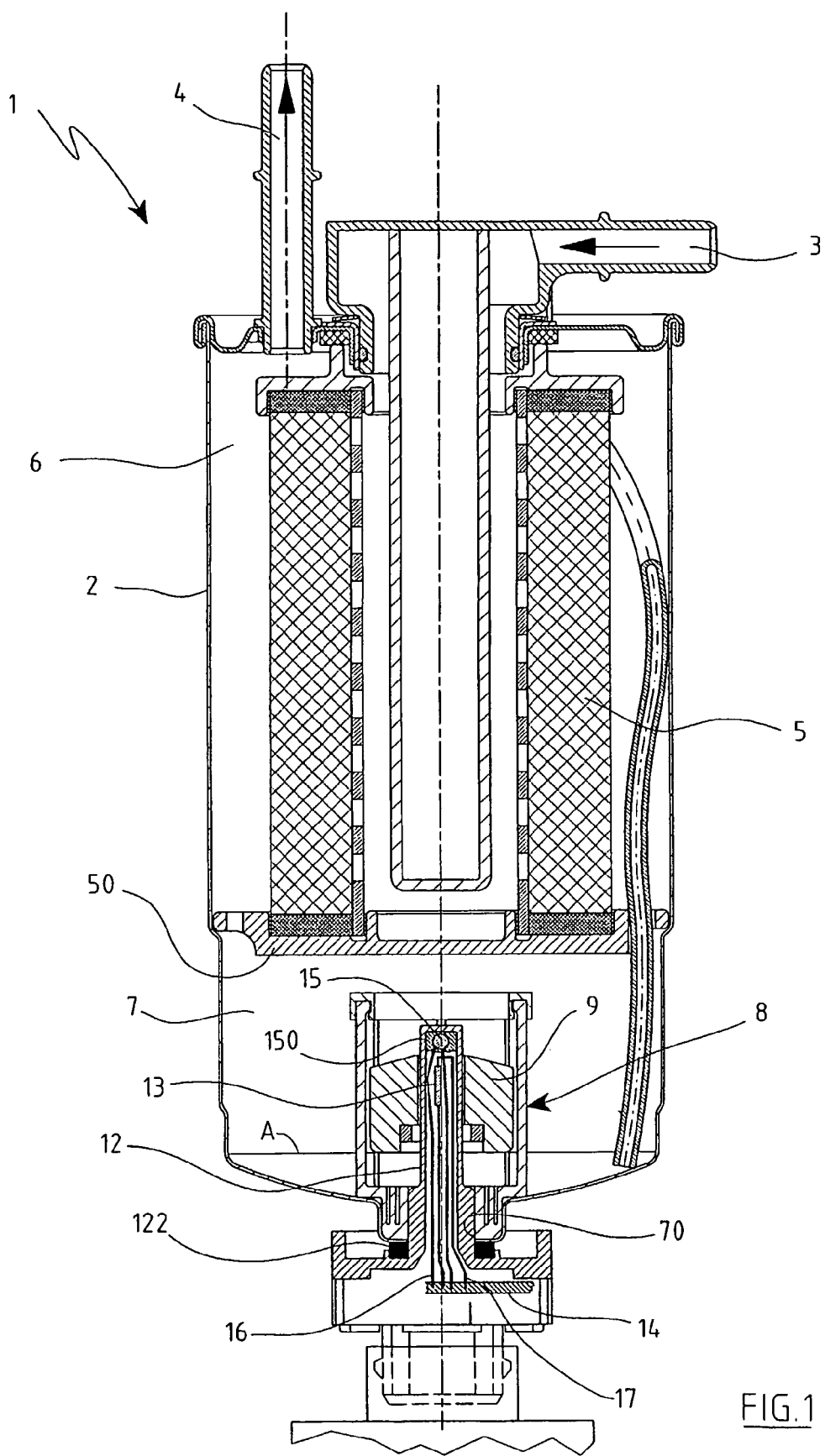
FIG. 1 is a schematic illustration of the filter according to the invention.
Figure 2:
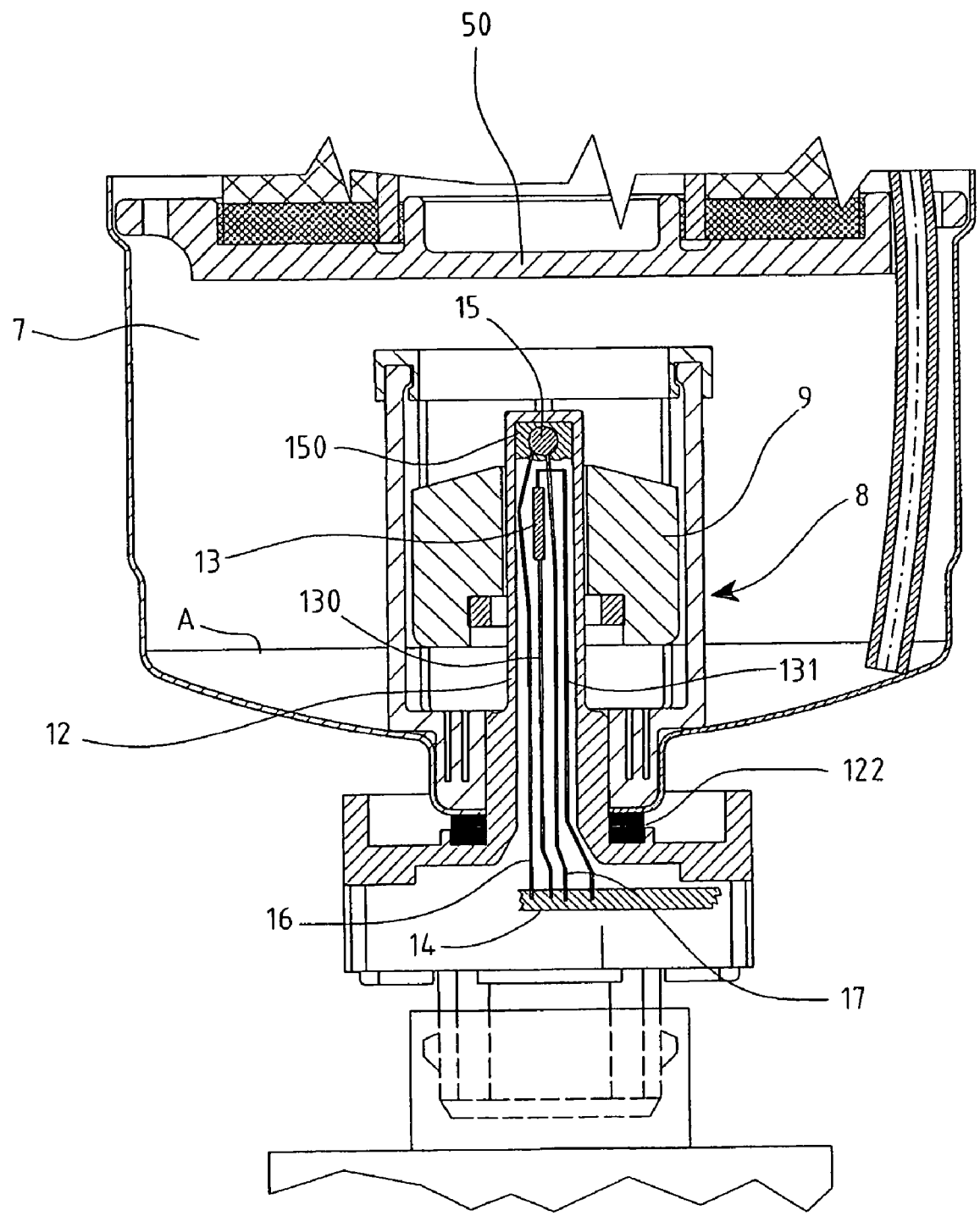
FIG. 2 is an enlarged view of the lower portion of FIG. 1.

FIG. 1 shows a filter 1, substantially of known type, comprising an outer casing 2 having a fuel inlet 3 and outlet 4. Said casing 2 houses internally a filter means 5 positioned within an upper chamber 6. The fuel enters the chamber 6 through the inlet 3 and after passing through the filter means 5 leaves through the outlet 4.

Below the chamber 6 and communicating therewith there is positioned a chamber 7 separated from the former by a perforated base 50, which also acts as a support element for the filter means 5.

The chamber 7 serves to collect the water which separates from the fuel and is therefore filled with fuel in its upper part, the separated water accumulating in the lower part.

On the base of the chamber 7 there is positioned a water level sensor 8 comprising a float 9, the specific gravity of which lies between the specific gravity of water and that of the fuel, and which is positioned in the collection chamber 7 under the influence of the level of the water A which collects on the bottom. The float 9 is slidable along a vertical guide stem 12, which projects into the chamber 7 by passing through a lower port 70 located at the lowest point of the chamber and closed by the stem 12 in collaboration with a seal gasket 122.

In the interior of the stem 12 there is positioned a magnetic field sensor element 13, for example of reed or Hall type, which is activated when the float, in moving upwards as the level of the accumulated water increases, reaches a position in correspondence with the element 13. The sensor element 13 is electrically connected to an electronic card 14 by two connection cables 130 and 131. Said card is connected to the engine control unit. When, by the effect of the water collected in the chamber 6, the float 10 reaches the level of the sensor 13, an electrical signal is generated and by way of the two conductor cables 130 and 131 is sensed by the electronic card 14, which makes it available to the engine electronic control unit, to warn the user by a warning lamp positioned on the vehicle dashboard or by a different warning signal.

When the water maximum level signal is generated, the control card 14 activates withdrawal means for the water collected in the chamber 7. Said water withdrawal means are associated with the lower end of the filter 1, but are not illustrated or described in detail as they are of known type. In the interior of the stem 12, in proximity to its free end, there is also present a temperature sensor 15 embedded in a layer of conductive resin 150, to measure the temperature of the fuel present in the chamber 7, this being equal to or at least indicative of the temperature of the fuel passing through the filter 1.

Figure 3:
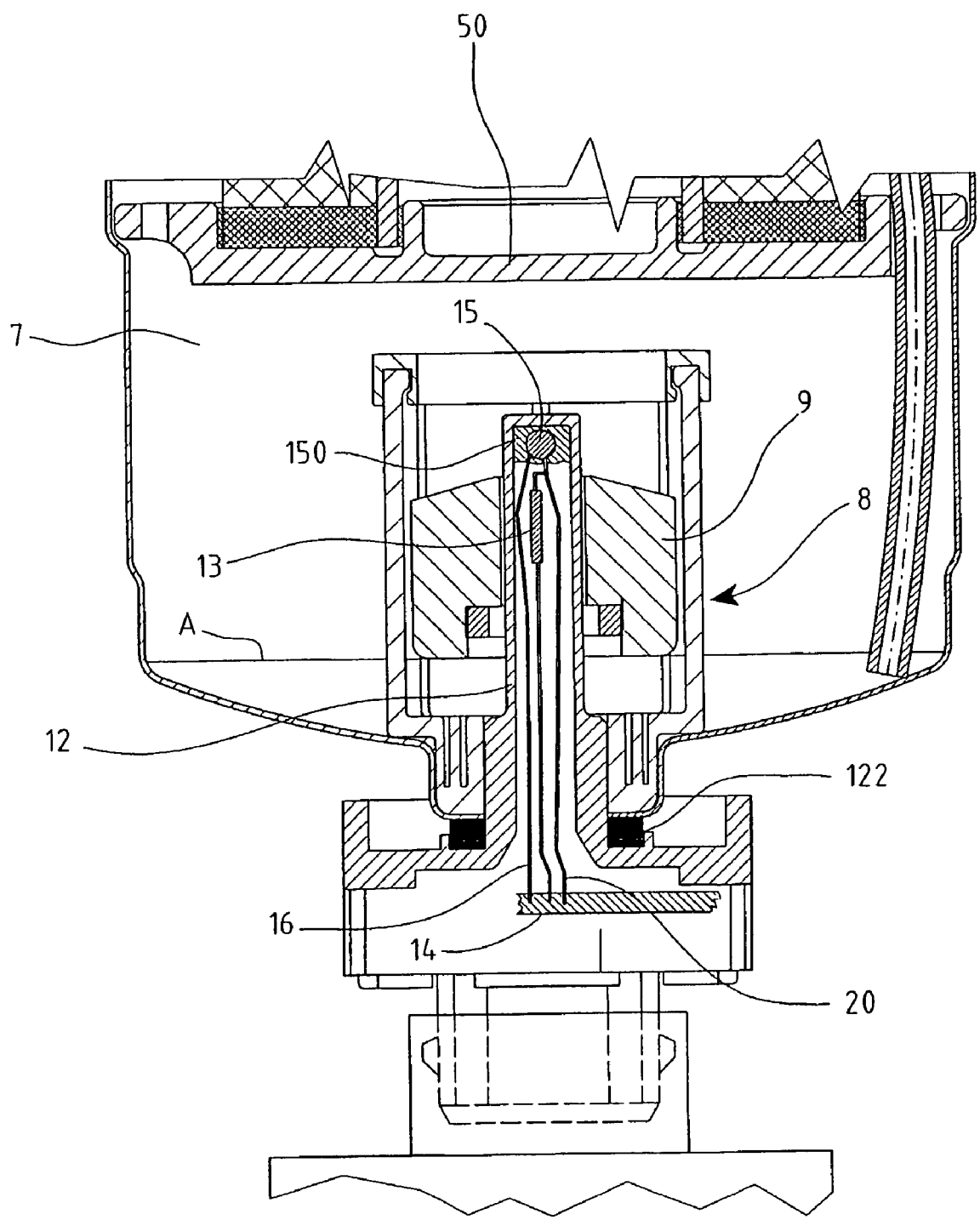
FIG. 3 is an enlarged view of the lower portion of the filter, on which a variant of the invention is installed.

The sensor 15, for example of NTC type, is connected to the electronic card by two conductors 16 and 17. The temperature value measured by the sensor 15 is fed to the engine electronic control unit via the card 14. FIG. 3 shows a variant of the invention in which one of the conductor cables connecting the sensor to the card 14 is also used as the conductor cable connecting the sensor 15 to the card itself. Hence in this case there is simplification of the electrical circuit connecting the sensors to the card as the cable 20 is used as a common conductor.

The invention claimed is:

1. A fuel filter for diesel engines with high pressure direct injection of common rail type and the like, comprising an outer casing provided with a fuel inlet conduit (3) and an outlet conduit (4), and internally housing a filter means, said casing comprising an upper chamber (6) for containing said filter means, a lower chamber (7) communicating with said upper chamber to collect the water which said filter means (5) separates from the fuel, and means (8) for measuring the level of the water collected in the lower chamber (7) contains a temperature sensor for generating an electrical signal, said signal being fed to an electronic card by two conductors.

2. A filter as claimed in claim 1 characterised in that said level measuring means comprises a float positioned in the lower chamber and having a specific gravity between the specific gravity of water and that of the fuel, and a float guide stem in the interior of which there is positioned a magnetic field sensor connected electrically to said electronic card by two conductors, said temperature sensor being positioned in the interior of said stem in proximity to its upper free end.

3. A filter as claimed in claim 2 characterised in that one of the conductors connecting said temperature sensor means to said card is also connected to said magnetic field sensor.

4. A filter as claimed in claim 1, characterised in that said temperature sensor is of NTC type.

5. A filter as claimed in claim 1, characterised in that said temperature sensor is embedded in a layer of conductive resin.

6. A fuel filter with a fuel distribution system for a diesel engine with high pressure direct injection to an engine feed pump wherein the fuel feed rate to the engine feed pump is greater than required by the engine for its operation, the excess fuel being used as a lubrication and cooling fluid for the feed pump, the fuel filter comprising an outer casing provided with a fuel inlet conduit (3) and an outlet conduit (4), said outer casing having an upper chamber (6) and a lower chamber (7), a filter for the fuel disposed in said upper chamber, a perforated base (50) separating said upper chamber from said lower chamber, said perforated base supporting said filter and permitting water to flow from said upper chamber to said lower chamber, temperature sensing means (15) in said lower chamber to measure the temperature in said casing and provide temperature information to an engine electronic control unit, said temperature sensing means comprising a temperature sensor embedded in a layer of conductive resin (150), means for measuring the water level comprising a float and a float guide stem having positioned therewithin a magnetic field sensor connected electronically to an electronic card (14), said electronic card (14) providing water level information to the engine electronic control unit , and wherein said temperature sensor is also connected to the magnetic field sensor for providing temperature information to the engine electronic control unit through said electronic card (14).

* * * * *